United States Patent

Knowles

[15] 3,683,007
[45] Aug. 8, 1972

[54] ALKYL-N-(4-ALKYL-OR CYCLOALKYL-METHYL CYCLOHEXYL) CARBAMATES

[72] Inventor: Richard N. Knowles, Hockessin, Del.

[73] Assignee: E. I. du Pont de Nemours and Company, Wilmington, Del.

[22] Filed: April 20, 1967

[21] Appl. No.: 635,302

Related U.S. Application Data

[63] Continuation-in-part of Ser. No. 574,495, Aug. 18, 1966.

[52] U.S. Cl. ............260/468 B, 424/300, 260/468 C
[51] Int. Cl. ....................C07c 69/00, C07c 69/74
[58] Field of Search................260/482, 468 C, 468 B

[56] References Cited

UNITED STATES PATENTS 3,019,231   1/1962   Peppel et al................260/482
2,794,810   6/1957   Cusic..........................260/482
2,812,247   11/1957  Gysin et al.....................71/70

*Primary Examiner*—Leland A. Sebastian
*Attorney*—Herbert W. Larson

[57] ABSTRACT

Alkyl-N-(4-higher alkyl substituted cyclohexyl) carbamates of the formula:

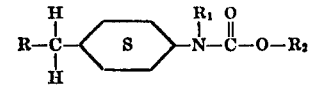

wherein
  R is alkyl, cycloalkyl, cycloalkylalkyl, bicycloalkyl or tricycloalkyl;
  $R_1$ is hydrogen, or alkyl; and
  $R_2$ is alkyl.
Typical is methyl-N-(cis-4-cyclohexylmethylcyclohexyl)carbamate useful as an animal repellant.

9 Claims, No Drawings

3,683,007

1

ALKYL-N-(4-ALKYL-OR CYCLOALKYL-METHYL CYCLOHEXYL) CARBAMATES

CROSS-REFERENCE

This application is a continuation-in-part of my application Ser. No. 574,495, filed Aug. 18, 1966.

BACKGROUND OF THE INVENTION

United States patent application Ser. No. 532,544, filed Mar. 1, 1966, now abandoned discloses compounds containing a cyclohexyl ring structure having utility as animal repellants. I have now discovered another class of compounds containing a cyclohexyl ring structure which also has utility as animal repellants.

SUMMARY OF THE INVENTION

This invention relates to cyclohexylcarbamates.

More specifically, this invention refers to alkyl-N-(4-high alkyl substituted cyclohexyl)carbamates, compositions containing them and methods of applying them to animals.

Potent animal inhalation irritant effects are achieved by applying to animals or their habitat, compounds of the formula:

(1) 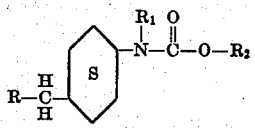

wherein
- R is alkyl of three through eight carbon atoms, cycloalkyl of four through nine carbon atoms, cycloalkylalkyl of five through 10 carbon atoms, bicycloalkyl of seven through 10 carbon atoms, or tricycloalkyl of 10 through 11 carbon atoms;
- $R_1$ is hydrogen or alkyl of one through three carbon atoms; and
- $R_2$ is alkyl of one through three carbon atoms.

Substitutions on the cyclohexyl ring must be in the cis configuration to obtain optimum irritant effects.

Preferred because of high irritant activity at low use rates are methyl and ethyl-N-(cis-4-cyclohexylmethylcyclohexyl)carbamates.

UTILITY

Compounds of this invention cause potent irritation to animal tissue, particularly to the mucous membranes.

Animals exposed to the above compounds show signs of severe respiratory irritation and are quickly incapacitated. These compounds have two advantages over currently used riot control agents such as 2-chloroacetophenone (CN) and animal repellants such as allylisothiocyanate for dogs and bone tar oil for deer. One, the compounds are more potent at low concentrations, and two, provide residual activity over longer periods of time.

Compounds of this invention and particularly ethyl-N-(cis-4-cyclohexylmethylcyclohexyl)carbamate have potential use as riot control agents, dog repellants, deer repellants, rodent repellants and for contaminating caves or underground tunnels.

PREPARATION

The compounds of this invention can be prepared by the following synthetic route:

R, $R_1$ and $R_2$ in the following reactions are as defined above in formula (1)

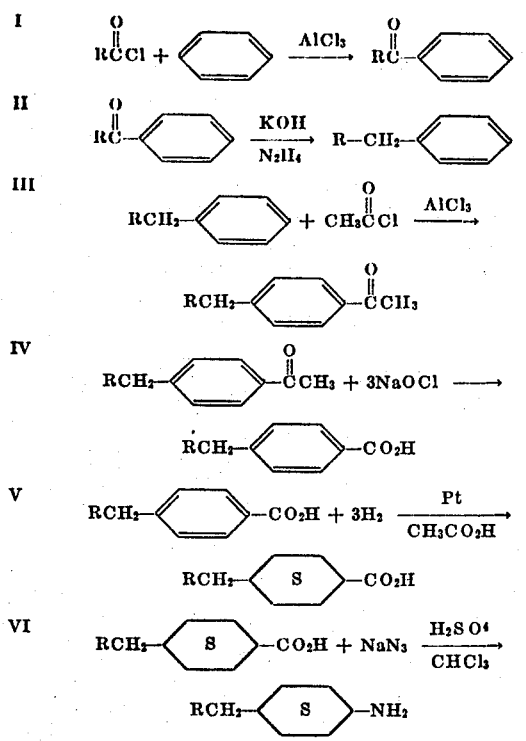

The amine intermediates used for preparing those compounds where $R_1$ is methyl, ethyl or propyl are prepared according to Reactions VII, VIII, and IX shown below. Substitution of propionic anhydride for the acetic anhydride of Reaction VII gives intermediates for those compounds where $R_1$ is propyl.

VII
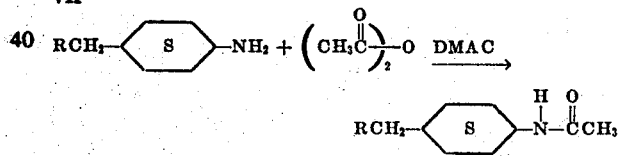

VIII
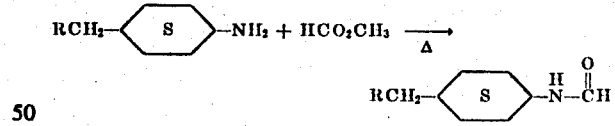

These amides are then reduced in reaction IX to give the desired dialkyl amine. R' is hydrogen, methyl or ethyl and changes to $R_1$ is Reaction IX.

IX
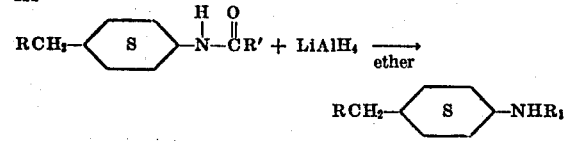

An alternative synthesis route can be used for preparing the amine intermediates if the appropriately substituted aniline derivatives are available. This route is illustrated below.

X
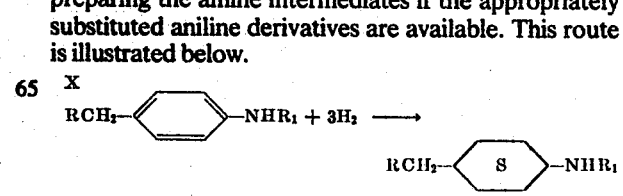

The carbamates of this invention are synthesized by the following reaction. Since the cis/trans mixtures of amines are obtained from Reactions VI, IX and X, the resulting carbamates are also cis/trans mixtures. The cis:trans ratio ranges from 1:1 to 3:1 depending on the method of synthesis of the amines. The irritant carbamates can be used without separation of the isomers. However, the cis isomer provides the high level of irritant effects.

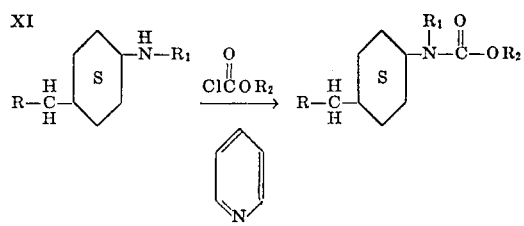

The Friedel-Crafts reaction (I) is run by carefully adding the acid chloride to a stirring mixture of aluminum chloride and benzene. A slight molar excess of catalyst is used; benzene serves as both a solvent and reactant. The acid chloride is added at a rate sufficient to keep the temperature of the slurry at about 30°–40° C. The mixture is stirred for one additional hour after all of the acid chloride is added, and then water is slowly added to decompose the catalyst. Sufficient water is added so that all the solids are dissolved. The phenylalkyl ketone is isolated from the benzene solution and is purified by distillation.

The Wolff-Kishner reduction (II) is run in 2-(2-ethoxyethoxy)ethanol using a modification of the procedure given by J. Cason, et al. in *Organic Synthesis*, Collective Vol. IV, John Wiley and Sons, New York, (1963), p. 510. Once the reactants are mixed, they are heated to reflux for a period of 3 to 5 hours. The reflux temperature is generally in the 130°–140° C. range. After completion of the reflux period, the solution is cooled and poured into 3 to 4 volumes of water. The alkylbenzene product is extracted with pentane and purified by distillation.

The Friedel-Crafts reaction (III) is run by mixing approximately equimolar quantities of the reactants together in hexane at less than 5° C. The stirring mixture is slowly allowed to warm to room temperature, and when hydrogen chloride evolution subsides, the mixture is refluxed several hours. Water is then added slowly to decompose the catalyst. A sufficient quantity of water is then added to insure that all of the solids are dissolved. The desired acetophenone derivative is isolated from the organic phase, and purified by distillation. Gas-liquid chromatography on an F & M Model 500 Gas Chromatographer using a 2 foot × ¼ inch O.D. stainless steel column, containing 10 percent Carbowax 20M on 60–80 mesh Diatoport T indicates that about 98 percent of the acetophenone is the 1,4 isomer and 2 percent is the 1,2 isomer. The 1,2 isomer has the shorter retention time.

The haloform reaction (IV) is run by slowly adding a cold (<5° C.) sodium hypochlorite solution to a stirring solution of the acetophenone derivative in methanol. This is a modification of the procedure used by E. E. Royals (J. Am. Chem. Soc., 69, 841 (1947) for the haloform reaction of α-ionone. After the sodium hypochlorite solution is added, the mixture is warmed to room temperature, and left standing over night. Thereafter, the mixture is heated to reflux, and the distillate collected until the pot temperature rises to 95°–97° C.; most of the methanol is distilled. The pot is then cooled to room temperature. In those reactions where R is a low molecular weight radical such as butyl, the sodium benzoate derivative remains dissolved; however, when R is a high molecular weight radical such as octyl, the sodium benzoate derivative precipitates as a soapy solid. Sulfur dioxide is bubbled into the alkaline pot concentrate until the pH drops below 3. The precipitated benzoic acid derivative is either filtered and washed with water, or extracted with methylene chloride depending on whether or not the benzoic acid is easily filterable or is of a soapy nature. Some of these benzoic acid derivatives can be recrystallized from acetonitrile or pentane, and some are purified merely by trituration with cold pentane.

The catalytic hydrogenation (V) is performed at 2 to 3 atmospheres of hydrogen using platinum oxide as catalyst and glacial acetic acid as solvent. A Parr Hydrogenation Apparatus is suitable for these reactions. This reaction produces a cis/trans isomer mixture of about 2 or 3/1. The cis and trans designation refers to the relationship of the 4-alkyl substituent and carboxylic acid group on the cyclohexane ring, this is illustrated below

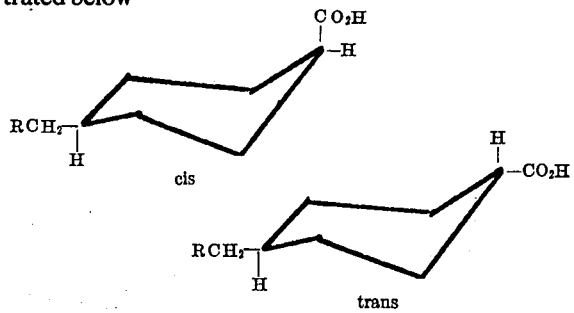

The Schmidt reaction (VI) is performed by dissolving the cyclohexane carboxylic acid derivative in a mixture of chloroform and concentrated sulfuric acid. Sodium azide is then added in small portions to the stirring mixture at a rate sufficient to keep the reaction temperature between 35° and 45° C. The mixture is stirred at about 45° to 50° C. until the bubbling nearly stops (1 to 3 hours). The mixture is then transferred to a separatory funnel, and the lower, gelatinous sulfuric acid, layer is slowly dripped onto ice. The amine sulfate precipitates as a soapy material which slowly crystallizes. The chloroform should be kept away from the ice water mixture since it makes the work-up much more difficult. Those amines which crystallize as the hemisulfates or sulfates are filtered and washed with water. It is convenient to store these amines as their salts. Those amine-salts which fail to crystallize are converted to the free bases by making the sulfuric acid solution alkaline, and extracting the amine with dichloromethane. The amine is then purified by distillation. The Schmidt reaction proceeds without changing the cis/trans product ratio.

The acylation (VII) can be performed by dissolving the free amine in an equal volume of dimethylacetamide (DMAC) or dimethylformamide (DMF) and adding an excess of the desired acid anhydride to the stirring solution. This reaction is very exothermic. The solution is stirred for 10 minutes, and then it is poured into 10 to 100 volumes of water. The amide separates as an oil which subsequently crystallizes.

The acylation (VII) can also be performed using the amine sulfate directly according to the following procedure. The amine sulfate is ground into a powder, and added to a 1:1 mixture of DMAC and 20 percent aqueous sodium hydroxide solution; there should be a large excess of base. The mixture is stirred for 10 to 15 minutes, and then an excess of the desired acid anhydride is added. The mixture warms to about 60° to 65° C. The sulfate entirely dissolves in 10 to 20 minutes. The solution is then poured into 10 to 100 volumes of water. The amide is isolated by the usual procedures given above.

The formamides of reaction VIII are prepared by refluxing the amine with methylformate for several hours. The excess methylformate is stripped from the reaction, and the residual formamide is purified by recrystallization.

These acylations proceed without changing the cis/trans product ratio.

The formamide, acetamide or propionamide is reduced by lithium aluminum hydride in refluxing ether according to Reaction IX. The amine is isolated from the reaction after the lithium aluminum hydride is destroyed. These amines are purified by distillation.

The hydrogenation (X) can be performed on a Parr Hydrogenation Apparatus using platinum oxide as catalyst and glacial acetic acid as solvent. The cis:trans ratio of the cyclohexylamine product is about 1:1.

The desired carbamates are prepared according to Reaction XI. The alkyl chloroformate is added to pyridine, and a complex with pyridine forms. After having stirred for one-half hour the complex is treated with a stoichiometric amount of the desired amine. After having stirred for an additional hour, the pyridine solution is poured into water. The carbamate separates as an oil which is isolated as an oil by the usual procedures. This oil slowly crystallizes. If desired the cis and trans carbamate isomers can be separated by chromatography over silicic acid using chloroform as eluant. The ratio of silicic acid to cis:trans compound is 50:1.

COMPOSITIONS

Compounds of this invention can be administered alone but are generally contained in a composition with an inert diluent non-toxic to animals. The diluent selected depends on the route of administration.

Emulsifying agents can be used with the diluent and compound of formula (1) to aid in dispersion of the active ingredient. Emulsifying agents that could be used include alkylaryl polyethoxy alcohols, alkyl and alkylaryl polyether alcohols, polyoxyethylene sorbitol or sorbitan fatty esters, polyethylene glycol fatty esters, fatty alkylol amide condensates, amine salts of fatty alcohol sulfates plus long chain alcohols and oil soluble petroleum sulfonates.

The amount of emulsifying agent in the composition will range from 0.1 to 20 percent by weight.

Since the compounds of the present invention would generally be administered by vapor or spray application, the compositions will contain a liquid diluent such as water, acetone, hexane, gasoline, kerosene, other hydrocarbon oils, alcohols or other liquids generally used in pharmaceutical preparations.

The amount of active ingredient in the composition will vary from 0.005 percent by weight to 95 percent or even higher. The diluent will generally constitute the major proportion of the composition and the amount of active ingredient will be less than 50 percent by weight. The exact concentration of the active ingredient will depend on the mechanism used for administration and will be easily understood by one knowledgeable in pharmaceutical application rates.

APPLICATION

A quantity of active ingredient sufficient to cause irritation to animal tissue is 100 to 5,000 micrograms per liter of air at exposure of one minute. Rates of over 10,000 micrograms per liter of air at exposure of 1 minute kills 50 percent of the mice which are treated.

The following additional examples are provided to more particularly explain the invention.

EXAMPLE 1

Ethylchloroformate (18 grams, 0.17 mole) is added to 250 milliliters of stirring pyridine. This reaction is quite exothermic and must be done cautiously. After having a stirred for one-half hour, a solution of 33 grams (0.17 mole) of a cis/trans mixture of 4-cyclohexylmethylcyclohexylamine in 200 milliliters of pyridine is added; this addition must be performed carefully since the reaction is quite exothermic. After having stirred for an additional one-half hour, the pyridine solution is poured into one liter of ice water. The oil which separates is extracted with ether. The ethereal solution is washed sequentially with 10 percent aqueous hydrochloric acid, 10 percent aqueous sodium hydroxide, and finally with water. The ethereal solution is dried ($MgSO_4$), filtered and evaporated in vacuum leaving an oil which slowly crystallizes. The pure ethyl-N-(4-cyclohexylmethylcyclohexyl)carbamate melts at 88°–90 C.

Calculated for $C_{16}H_{29}NO_2$:
 C, 71.9; H, 11.0; N, 5.2%
Found:
 C, 71.6; H, 11.2; N, 5.9%.

Mice are treated by aerosol exposure to the cis/trans mixture of ethyl-N-(4-cyclohexylmethylcyclohexyl)-carbamate in the following manner: The compound is administered as an aerosol into a 2.8 liter chamber. The exposure chamber consists of a 2.8 liter bell jar over a nebullizer inserted through the floor of the chamber. Mice are exposed for 5 minutes to 200.0 micrograms per liter (1,000 CT). The compound is dissolved in 1.4 ml. of acetone and during a span of 20 seconds the compound is sprayed up into the chamber. No further air is transferred into or out of the chamber during the 5 minute exposure.

After this exposure, irritant activity is observed in all mice exposed, but not in controls exposed to 1.4 ml. of acetone alone. Irritant activity can be described as the presence of one or more of the following reactive signs:
 a. hyperemia of the ears, nose and tail
 b. abnormal gait, including rubbing of the nose on the floor while running about
 c. salivation
 d. dyspnea
 e. hunched posture
 f. face-pawing.

EXAMPLES 2 – 15

The following compounds are made in the manner of the ethyl-N-(4-cyclohexylmethylcyclohexyl)carbamate of Example 1 by substituting like molar amounts of the appropriate reactants for the ethylchloroformate and 4-cyclohexylmethylcyclohexylamine of Example 1. The compounds are formulated and applied in like manner to provide like results.

2. Methyl-N-(4-cyclohexylmethylcyclohexyl)carbamate.
3. Ethyl-N-(4-n-butylcyclohexyl)carbamate.
4. Propyl-N-(4-cyclopentylmethylcyclohexyl)carbamate.
5. Methyl-N-methyl-N-(4-n-hexylcyclohexyl)carbamate.
6. Propyl-N-methyl-N-(4-n-nonylcyclohexyl)carbamate.
7. Ethyl-N-(4-n-octylcyclohexyl)carbamate.
8. Ethyl-N-(4-n-heptylcyclohexyl)carbamate.
9. Ethyl-N-(4-(3-methylpentyl)cyclohexyl)carbamate.
10. Ethyl-N-(4-cycloheptylmethylcyclohexyl)carbamate.
11. Methyl-N-(4-cyclooctylmethylcyclohexyl)carbamate.
12. Methyl-N-(4-cyclononylmethylcyclohexyl)carbamate.
13. Propyl-N-methyl-N-(4-iso-butylcyclohexyl)carbamate.
14. Ethyl-N-(4-(3,5,5-trimethylhexyl)cyclohexyl)carbamate.
15. Ethyl-N-(4-n-pentylcyclohexyl)carbamate.
16. Ethyl-N-(4-(3-cyclopentylpropyl)cyclohexyl)carbamate.
17. Methyl-N-(4-(2-[2.2.1]-bicycloheptylmethyl)cyclohexyl)-carbamate.
18. Methyl-N-(4-(2-[3.2.0]-bicycloheptylmethyl)cyclohexyl)-carbamate
19. Ethyl-N-(4-(2-[3.3.1]-bicyclononylmethyl)cyclohexyl)carbamate.
20. Ethyl-N-(4-(1-adamantylmethyl)cyclohexyl)carbamate
21. Ethyl-N-methyl-N-(4-(1-homoadamantylmethyl)cyclohexyl)carbamate.

EXAMPLE 22

Dogs are exposed to vapors from ethyl-N-(4-cyclohexylmethylcyclohexyl)carbamate in acetone spotted on a 6 cm. circle of filter paper. The dog's head is held by an operator, and the dried paper is held 6 to 12 cm. from the muzzle. Within 10–30 seconds the dog salivates, licks his lips, and occasionally face-paws. Generally, he struggles to escape further irritant effects. As little as 5 milligrams on paper can generate enough vapor at room temperature to cause visible discomfort in most dogs.

EXAMPLE 23

A test chamber, comprising a plastic rectangular box of 65 liters, is filled with an aerosol spray of ethyl-N-(4-cyclohexylmethylcyclohexyl)carbamate. The spray is administered 2 cm. above an immobilized rabbit, and 3 cm. distant from the end of the nose. The aerosol is aimed directly at the rabbit. Administration of compound takes approximately 1 minute. At 5,000 CT (5 minutes), the rabbit exhibited lacrimation, nasal exudate, face-pawing, and constant head shaking. After several minutes, the eyes became static after periods of blinking. Dyspnea continued for two hours after exposure.

If it is desired to separate the cis isomer in Examples 1 – 21 the procedures described above using chromatography over silicic acid can be employed.

I claim:

1. A compound of the formula:

$$R-\underset{H}{\overset{H}{\underset{|}{C}}}-\left\langle S \right\rangle-\underset{}{\overset{R_1}{\underset{|}{N}}}-\overset{O}{\overset{\|}{C}}-O-R_2$$

wherein
R is selected from the group consisting of alkyl of three through eight carbon atoms, cycloalkyl of four through nine carbon atoms, cycloalkylalkyl of five through 10 carbon atoms, bicycloalkyl of seven through 10 carbon atoms, and tricycloalkyl of 10 through 11 carbon atoms;
$R_1$ is elected from the group consisting of hydrogen and alkyl of one through three carbon atoms; and
$R_2$ is alkyl of 1 through 3 carbon atoms.

2. A compound according to claim 1 which is methyl-N-(cis-4-cyclohexylmethylcyclohexyl)carbamate.

3. A compound according to claim 1 which is ethyl-N-(cis-4-cyclohexylmethylcyclohexyl)carbamate.

4. A compound according to claim 1 which is propyl-N-(cis-4-cyclopentylmethylcyclohexyl)carbamate.

5. A compound according to claim 1 which is methyl-N-(cis-4-n-hexylcyclohexyl)carbamate.

6. A compound according to claim 1 which is methyl-N-(cis-4-(2-[2.2.1]-bicycloheptylmethyl)cyclohexyl)-carbamate.

7. A compound according to claim 1 which is ethyl-N-(cis-4-cycloheptylmethylcyclohexyl)carbamate.

8. A compound according to claim 1 which is ethyl-N-(cis-4-n-heptylcyclohexyl)carbamate.

9. A compound according to claim 1 which is ethyl-N-(cis-4-n-butylcyclohexyl)carbamate.

* * * * *